US00RE50765E

(19) United States
(12) Reissued Patent
Tachi

(10) Patent Number: US RE50,765 E
(45) **Date of Reissued Patent: *Jan. 27, 2026**

(54) IMAGE PROCESSING APPARATUS HAVING REPORT PRINTING FUNCTION, METHOD OF CONTROLLING IMAGE PROCESSING APPARATUS, AND STORAGE MEDIUM

(71) Applicant: CANON KABUSHIKI KAISHA, Tokyo (JP)

(72) Inventor: Daiki Tachi, Kawasaki (JP)

(73) Assignee: CANON KABUSHIKI KAISHA, Tokyo (JP)

( * ) Notice: This patent is subject to a terminal disclaimer.

(21) Appl. No.: 18/142,390

(22) Filed: May 2, 2023

Related U.S. Patent Documents

Reissue of:
(64) Patent No.: 9,304,722
Issued: Apr. 5, 2016
Appl. No.: 14/799,947
Filed: Jul. 15, 2015

U.S. Applications:
(63) Continuation of application No. 16/553,576, filed on Aug. 28, 2019, now Pat. No. Re. 49,886, which is an
(Continued)

(30) Foreign Application Priority Data

Nov. 1, 2013 (JP) ..... 2013-228222

(51) Int. Cl.
*G06F 15/00* (2006.01)
*G03G 15/00* (2006.01)
(Continued)

(52) U.S. Cl.
CPC ..... *G06F 3/1237* (2013.01); *G03G 15/502* (2013.01); *G06F 3/1285* (2013.01); *G06K 15/005* (2013.01); *G06K 15/40* (2013.01)

(58) Field of Classification Search
CPC .... G03G 15/502; G06K 15/005; G06K 15/40; G06F 3/1237; G06F 3/1285
See application file for complete search history.

(56) References Cited

U.S. PATENT DOCUMENTS 6,004,276 A 12/1999 Wright et al.
6,072,599 A * 6/2000 Oba ..... H04N 1/00204 358/404
(Continued)

FOREIGN PATENT DOCUMENTS

JP 2768979 B2 6/1998
JP H1188647 A 3/1999
(Continued)

OTHER PUBLICATIONS

Notice of Allowance issued in U.S. Appl. No. 14/527,871 mailed Apr. 14, 2015.
(Continued)

*Primary Examiner* — Joshua D Campbell
(74) *Attorney, Agent, or Firm* — ROSSI, KIMMS & McDOWELL LLP

(57) ABSTRACT

An image processing apparatus that is capable of performing report printing in a language desired by a user in either manual report printing or autonomic report printing. A storage unit stores information on the image processing apparatus. A touch panel receives input from a log-in user A control unit controls execution of the automatic report printing in which the information is printed by the printing unit as a report when predetermined conditions are satisfied, and execution of the manual report printing in which the information is printed by the printing unit as a report based on an instruction from the log-in user. The control unit performs the automatic report printing in a predetermined
(Continued)

language and performs the manual report printing in a language for the log-in user.

10 Claims, 13 Drawing Sheets

Related U.S. Application Data application for the reissue of Pat. No. 9,304,722, which is a continuation of application No. 14/527,871, filed on Oct. 30, 2014, now Pat. No. 9,111,197.

(51) Int. Cl.

| | |
|---|---|
| ***G06F 3/12*** | (2006.01) |
| ***G06K 1/00*** | (2006.01) |
| ***G06K 15/00*** | (2006.01) |

(56) References Cited

U.S. PATENT DOCUMENTS

| | | | | |
|---|---|---|---|---|
| 7,063,469 | B2 | 6/2006 | Nomura et al. | |
| 7,193,735 | B2 | 3/2007 | Asahi | |
| 7,852,502 | B2 | 12/2010 | Horiyama et al. | |
| 8,478,710 | B2 | 7/2013 | Andreoli et al. | |
| 2009/0201544 | A1 | 8/2009 | Kumakura et al. | |
| 2010/0053692 | A1 | 3/2010 | Machiyama | |
| 2011/0058189 | A1 | 3/2011 | Kuwamura | |
| 2012/0257234 | A1 | 10/2012 | Kanuma | |
| 2013/0286425 | A1 | 10/2013 | Nakamura et al. | |
| 2014/0114297 | A1* | 4/2014 | Woodley et al. | 606/6 |
| 2015/0277824 | A1* | 10/2015 | Hiruma | 358/1.15 |

FOREIGN PATENT DOCUMENTS

| | | | |
|---|---|---|---|
| JP | 2005196397 | A | 7/2005 |
| JP | 2005197923 | A | 7/2005 |
| JP | 2006026972 | A | 2/2006 |
| JP | 2006135774 | A | 5/2006 |
| JP | 2008021118 | A | 1/2008 |
| JP | 2009188842 | A | 8/2009 |
| JP | 2010062775 | A | 3/2010 |
| JP | 2010170233 | A | 8/2010 |
| JP | 2013-007958 | A | 1/2013 |

OTHER PUBLICATIONS

Notice of Allowance issued in U.S. Appl. No. 14/799,947 mailed Nov. 25, 2015.

Office Action issued in Japanese Appln. No. 2021-086998 mailed on Mar. 8, 2022.

Office Action issued in U.S. Appl. No. 16/553,576 mailed Dec. 22, 2020.

Office Action issued in U.S. Appl. No. 16/553,576 mailed Aug. 2, 2021.

Office Action issued in U.S. Appl. No. 16/553,576 mailed May 16, 2022.

Office Action issued in U.S. Appl. No. 16/553,576 mailed Oct. 31, 2022.

Notice of Allowance issued in U.S. Appl. No. 16/553,576 mailed Feb. 3, 2023.

Notice of Allowance issued in U.S. Appl. No. 14/527,871, dated Apr. 14, 2015.

* cited by examiner

*FIG. 4*

400

| 401 USER NAME | 402 DISPLAY LANGUAGE |
|---|---|
| A | JAPANESE |
| B | ENGLISH |
| C | FRENCH |
| D | ENGLISH |
| E | JAPANESE |

**********
*COMMUNICATION MANAGEMENT REPORT*
**********

| DESTINATION | COMMUNICATION MODE | NUMBER OF SHEETS | RESULT |
|---|---|---|---|
| ¥¥AAA¥BB | FTP | 2 | OK |
| 03-XXXX-YYYY | FAX | 3 | OK |
| ⋮ | ⋮ | ⋮ | ⋮ |
| ¥¥BBB¥AA | SMB | 0 | NG |

**********
* TRANSMISSION RESULT REPORT *
**********

TRANSMISSION UNSUCCESSFUL

| | |
|---|---|
| TRANSMISSION DESTINATION | ¥¥AAA¥¥BB |
| DOCUMENT NAME | CC |
| NUMBER OF SHEETS | 0 |
| RESULT | NG |

**********
* TRANSMISSION RESULT REPORT *
**********

TRANSMISSION COMPLETED

| | |
|---|---|
| TRANSMISSION DESTINATION | ¥¥AAA¥¥BB |
| DOCUMENT NAME | CC |
| NUMBER OF SHEETS | 2 |
| RESULT | OK |

*FIG. 8*

800

| 801 REPORT NAME | 802 AUTOMATIC REPORT | 803 RESULT REPORT |
|---|---|---|
| COUNT REPORT | OFF | OFF |
| 100-COMMUNICATION MANAGEMENT REPORT | ON | OFF |
| TRANSMISSION RESULT REPORT | ON | ON- ON |
| ... | ... | ... |

IMAGE PROCESSING APPARATUS HAVING REPORT PRINTING FUNCTION, METHOD OF CONTROLLING IMAGE PROCESSING APPARATUS, AND STORAGE MEDIUM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

*This application is a reissue continuation application of U.S. patent application Ser. No. 16/553,576, which is an application for reissue of U.S. Pat. No. 9,304,722, U.S. Pat. No. 9,304,722 is a continuation of U.S. patent application Ser. No. 14/527,871, filed on Oct. 30, 2014, now U.S. Pat. No. 9,111,197.*

BACKGROUND OF THE INVENTION

1. Field of the Invention

The present invention relates to an image processing apparatus having a report printing function of printing setting information, history information, and so forth on the image processing apparatus, a method of controlling the image processing apparatus, and a storage medium.

2. Description of the Related Art

There are known image processing apparatuses having a report printing function of printing setting information, history information, and so forth on the image processing apparatuses on sheets or the like. This report printing function offers manual report printing in which report printing is performed in accordance with a user's instruction and automatic report printing in which report printing is performed when conditions set for an image processing apparatus are satisfied. A report (output matter) output by manual report printing is used mainly by a user who has issued an instruction to perform printing. On the other hand, a report output by automatic report printing is used mainly for an administrator of the image processing apparatus to, for example, manage the condition of the image processing apparatus and check the status of use.

As image processing apparatuses, those equipped with a personalizing function of optimizing functions according to users are known. In these image processing apparatuses, for example, languages to be displayed on a screen of an operation unit are changeable by users (see Japanese Laid-Open Patent Publication (Kokai) No. 2013-7958).

However, a report output using the report printing function is usually printed in a language set in advance for an image processing apparatus. For this reason, when a user performs manual report printing, a language displayed on the screen of the operation unit using the personalizing function of the image processing apparatus and a language set in advance for the report printing function may differ from each other. In this case, a report may be created in a language that is not understandable or desired by the user who has performed manual report printing.

Possible methods of coping with this problem include a method that sets a language for use in report printing so that it can match a language displayed on the screen of the operation unit. In this case, however, if a language that is not understandable or desired by an administrator is set for the screen of the operation unit when automatic report printing is to be performed, a report is created in the language that is not understandable or desired by the administrator, and this is inconvenient.

SUMMARY OF THE INVENTION

The present invention provides an image processing apparatus that is capable of performing report printing in a language desired by a user in either manual report printing or autonomic report printing, a method of controlling the image processing apparatus, and a storage medium.

Accordingly, a first aspect of the present invention provides an image processing apparatus comprising a printing unit, a storage unit configured to store information on the image processing apparatus, a touch panel configured to receive input from a log-in user, and a control unit configured to control execution of automatic report printing in which the information is printed by the printing unit as a report when predetermined conditions are satisfied, and execution of manual report printing in which the information is printed by the printing unit as a report based on an instruction from the log-in user, wherein the control unit performs the automatic report printing in a predetermined language and performs the manual report printing in a language for the log-in user.

Accordingly, a second aspect of the present invention provides an image processing apparatus having a printing unit, comprising a storage unit configured to store setting information and history information on the image processing apparatus, a touch panel configured to receive input from a user and display information for the user, a management unit configured to, when the setting information or the history information is printed as a report, manage whether the report is an automatic report to be printed when predetermined conditions stored in the storage unit are satisfied or a result report to be printed when a predetermine job is executed, a determination unit configured to determine whether the report is to be printed by automatic report printing or manual report printing performed based on an instruction from the user, and a control unit configured to control execution of the automatic report printing and the manual report printing in accordance with the result of the determination made by the determination unit, wherein the storage unit additionally stores a language used by an administrator of the image processing apparatus and a display language for the touch panel, and the control unit performs the manual report printing in the display language and performs the automatic report printing in the display language when a report to be printed is the result report and performs the automatic report printing in the language used by the administrator when a report to be printed is not the result report.

Accordingly, a third aspect of the present invention provides a control method for an image processing apparatus having a printing unit, a storage unit, and a touch panel that receives input from a log-in user, comprising a storage step of storing, in the storage unit, information on the image processing apparatus, an automatic report printing step of printing the information by the printing unit as a report when predetermined conditions are satisfied, and a manual report printing step of printing the information by the printing unit as a report based on an instruction from the log-in user, wherein the automatic report printing is performed in a predetermined language, and the manual report printing is performed in a language for the log-in user.

Accordingly, a fourth aspect of the present invention provides a control method for an image processing apparatus having a printing unit, a storage unit, and a touch panel that receives input from a user and displays information for the user, comprising a setting step of setting a language used by an administrator of the image processing apparatus and setting a display language for the touch panel in association with the user, a storage step of storing setting information and history information on the image processing apparatus, a management step of, when the setting information or the history information is printed as a report, managing whether the report is an automatic report to be printed when predetermined conditions stored in the storage unit are satisfied or a result report to be printed when a predetermine job is executed, a determination step of determining whether the report is to be printed by automatic report printing or manual report printing performed based on an instruction from the user, and a control step of controlling execution of the automatic report printing and the manual report printing in accordance with the result of the determination made in the determination step, wherein in the control step, the manual report printing is performed in the display language, and the automatic report printing is performed in the display language when a report to be printed is the result report, and performed in the language used by the administrator when a report to be printed is not the result report.

Accordingly, a fifth aspect of the present invention provides a non-transitory computer-readable storage medium storing a program for causing a computer of an image processing apparatus to execute a control method for an image processing apparatus having a printing unit, a storage unit, and a touch panel that receives input from a log-in user, the control method comprising a storage step of storing, in the storage unit, information on the image processing apparatus, an automatic report printing step of printing the information by the printing unit as a report when predetermined conditions are satisfied, and a manual report printing step of printing the information by the printing unit as a report based on an instruction from the log-in user, wherein the automatic report printing is performed in a predetermined language, and the manual report printing is performed in a language for the log-in user.

Accordingly, a sixth aspect of the present invention provides a non-transitory computer-readable storage medium storing a program for causing a computer of an image processing apparatus to execute a control method for an image processing apparatus having a printing unit, a storage unit, and a touch panel that receives input from a user and displays information for the user, the control method comprising a setting step of setting a language used by an administrator of the image processing apparatus and setting a display language for the touch panel in association with the user, a storage step of storing setting information and history information on the image processing apparatus, a management step of, when the setting information or the history information is printed as a report, managing whether the report is an automatic report to be printed when predetermined conditions stored in the storage unit are satisfied or a result report to be printed when a predetermine job is executed, a determination step of determining whether the report is to be printed by automatic report printing or manual report printing performed based on an instruction from the user, and a control step of controlling execution of the automatic report printing and the manual report printing in accordance with the result of the determination made in the determination step, wherein in the control step, the manual report printing is performed in the display language, and the automatic report printing is performed in the display language when a report to be printed is the result report, and performed in the language used by the administrator when a report to be printed is not the result report.

According to the present invention, when manual report printing or autonomic report printing is to be performed, whether a language for use in printing is a language to be used by the administrator or a display language to be used for display on the touch panel when the user uses the touch panel is determined according to information on a report. As a result, printing is performed in a language desired by the user in manual report printing or autonomic report printing.

Further features of the present invention will become apparent from the following description of exemplary embodiments (with reference to the attached drawings).

BRIEF DESCRIPTION OF THE DRAWINGS

FIG. 4 is a view showing an exemplary display language management table in the MFP in FIG. 2.

FIG. 8 is a view showing a report management table in the MFP in FIG. 2.

DESCRIPTION OF THE EMBODIMENTS

The present invention will now be described in detail with reference to the drawings showing an embodiment thereof.

Figure 1:
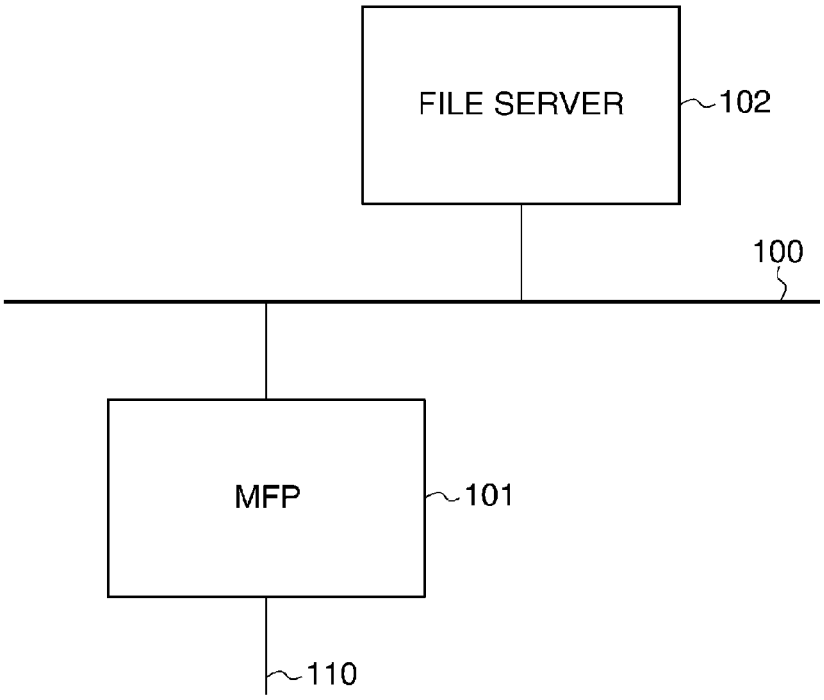
FIG. 1 is a diagram schematically showing an overall arrangement of an image processing system according to embodiments of the present invention.

FIG. 1 is a diagram schematically showing an overall arrangement of an image processing system according to embodiments of the present invention. This image processing system is comprised of a multifunctional peripheral (hereafter referred to as "the MFP") 101 and a file server 102, which are connected to each other so that they can communicate with each other. The MFP 101 is connected to a public telephone line network 110.

It should be noted that the MFP 101 is an exemplary image processing apparatus, and the file server 102 is an exemplary file management apparatus. The LAN 100 may be either a wired LAN or a wireless LAN. Other apparatuses such as a client computer (hereafter referred to as "the client PC"), not shown, which instructs the MFP 101 to perform printing or the like are also connected to the LAN 100.

The MFP 101 is capable of sending image data (sending image files) to destinations, which are folders in the file server 102, using SMB (Server Message Block) or FTP (File Transfer Protocol). It should be noted that folders not only in the file server 102 but also in the client PC, not shown, mentioned above may be destinations. The MFP 101 is also capable of sending image data by electronic mail (by mail) via a mail server, not shown. The MFP 101 is able to carry out communications with (sending and receiving image data to and from) a facsimile, not shown, because it is connected to the public telephone line network 110.

Figure 2:
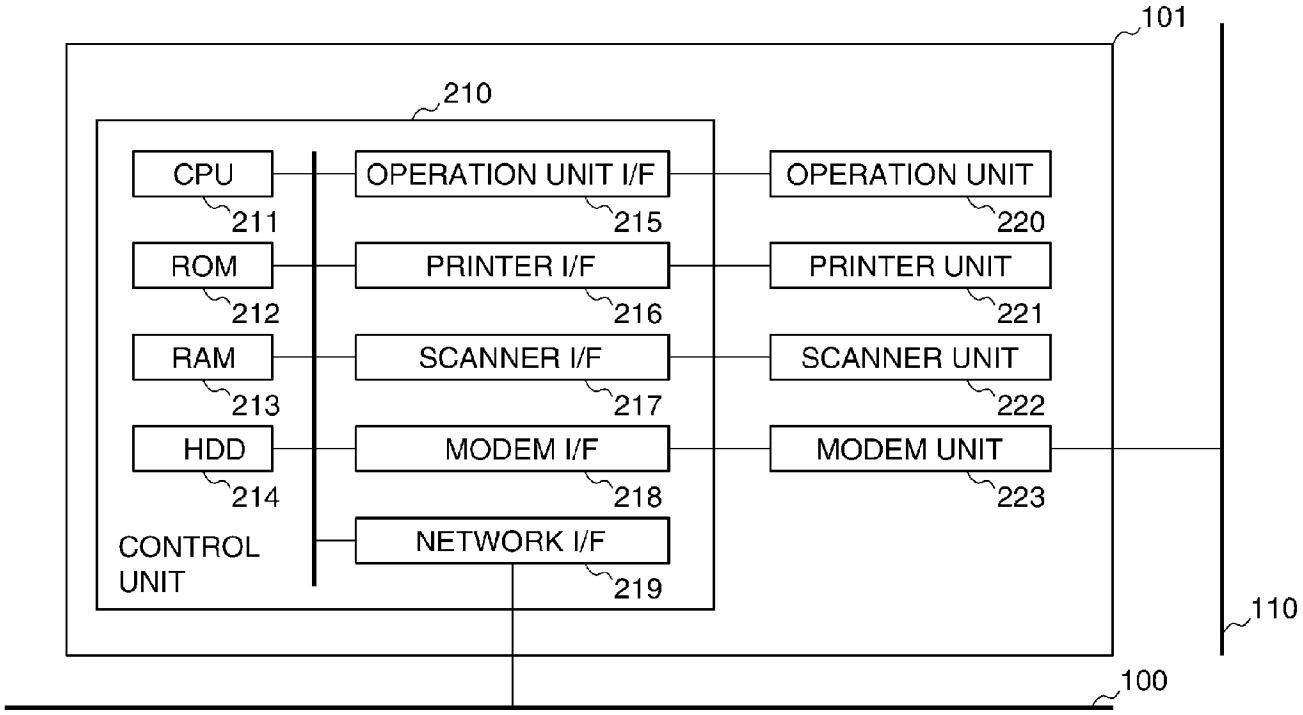
FIG. 2 is a block diagram schematically showing a hardware arrangement of an MFP constituting the image processing system in FIG. 1.

FIG. 2 is a block diagram schematically showing a hardware arrangement of the MFP 101. The MFP 101 has a control unit 210, an operation unit 220, a printer unit 221, a scanner unit 222, and a modem unit 223. The control unit 210 has a CPU 211, a ROM 212, a RAM 213, an HDD 214, an operation unit I/F 215, a printer I/F 216, a scanner I/F 217, a modem I/F 218, and a network I/F 219.

The control unit 210 controls the overall operation of the MFP 101. The CPU 211 reads control programs stored in the ROM 212, expands them in a work area of the RAM 213 to provide various types of control such as printing control, reading control, and transmission control. The RAM 213 is used as a temporary storage area such as main memory and a work area for the CPU 211. The HDD 214 stores image data, various programs, and various setting information, history information, and result information on the MFP 101.

It should be noted that concrete examples of the setting information on the MFP 101 include information on settings on languages to be displayed on a touch panel (to be described later), which are allowed to be set for each user, and information on languages for use in performing automatic report printing. Also, concrete example of the history information on the MFP 101 include information on histories of facsimile transmission and reception, and information on results of predetermined jobs such as file transmission, mail transmission, and printing.

The operation unit I/F 215 connects the operation unit 220 and the CPU 211 to each other. The operation unit 220 is comprised of, for example, the touch panel, which is a liquid crystal display having a touch panel function, and a keyboard (hardware buttons). The printer I/F 216 connects the printer unit 221 and the CPU 211 to each other. Image data to be printed by the printer unit 221 is transferred from the control unit 210 to the printer unit 221 via the printer I/F 216 and printed on a recording medium such as a sheet by the printer unit 221.

The scanner I/F 217 connects the scanner unit 222 and the CPU 211 to each other. The scanner unit 222 reads an image off an original to generate image data and inputs it to the control unit 210 via the scanner I/F 217. The MFP 101 is able to send the image data generated by the scanner unit 222.

The modem I/F 218 connects the modem 223 and the CPU 211 to each other. The modem 223 connects the control unit 210 to the public telephone line network 110. The modem 223 sends and receives image data to and from the facsimile, not shown, on the public telephone line network 110. The network I/F 219 connects the control unit 210 to the LAN 100. The network I/F 219 sends image data and information to the file server 102, the client PC, and so on, which are external apparatuses on the LAN 100, and on the other hand, receives various types of information from the external apparatuses on the LAN 100.

Figure 3:
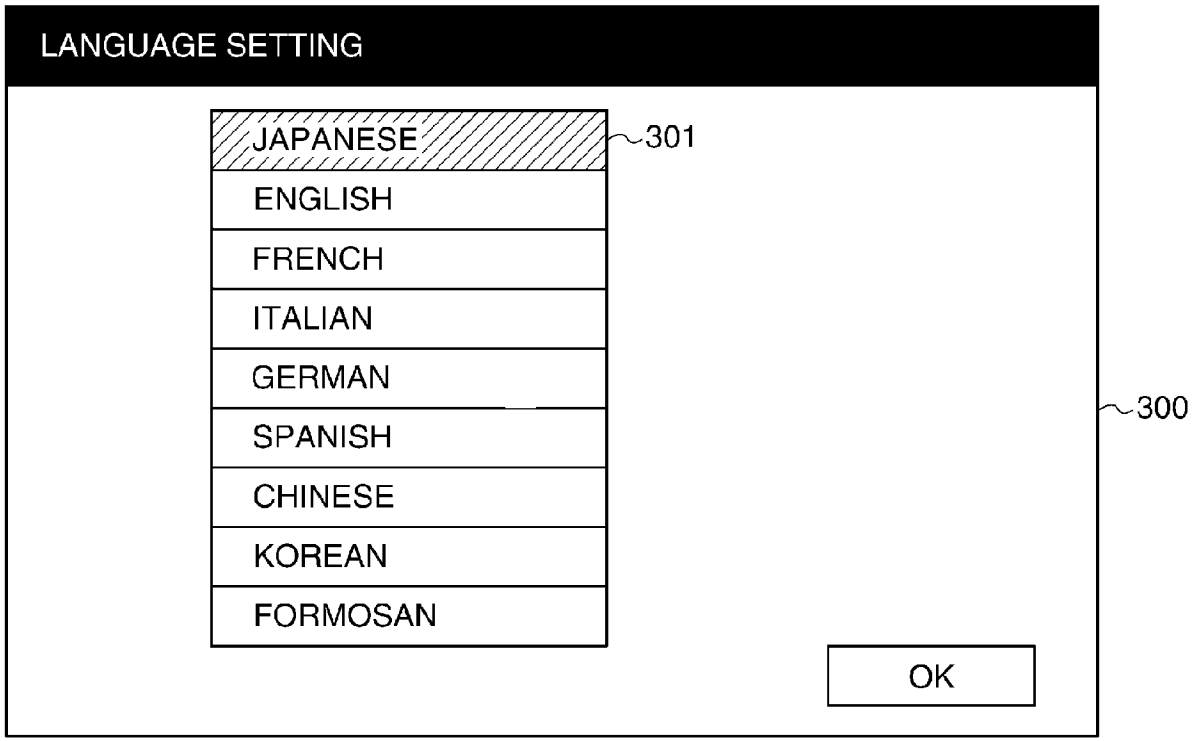
FIG. 3 is a view showing an exemplary operation screen displayed on a touch panel which an operation unit of the MFP in FIG. 2 has.

FIG. 3 is a view showing an exemplary operation screen displayed on the touch panel which the operation unit 220 has. The operation screen 300 in FIG. 3 is displayed on the touch panel by a system administrator of the MFP 101 logging into the MFP 101 and operating the operation screen 220 based on his or her own right when registering a display language which he or she uses (hereafter referred to as "the administrator's display language").

It should be noted that before the administrator's display language is set, the operation screen 300 in FIG. 3 is displayed on the touch panel, which the operation unit 220 has, in a default display language set in advance for the MFP 101 irrespective of who logs into the MFP 101. The default display language is also used in a case where a personalizing function of displaying different languages on the touch panel according to users is off, a case where a user who logs in has registered no display language for him or her, a case where a guest user has logged into the apparatus, and so on as will be described alter.

A language information field 301 in which a plurality of languages is listed is displayed on the operation screen 300, and languages displayed in the language information field 301 are display languages that can be set. The system administrator is allowed to select a desired language as the administrator's display language (apparatus language) from the languages displayed in the language information field 301. The system administrator touches a desired language among languages displayed in the language information field 301 and depresses an OK button. This completes setting of the administrator's display language, and setting information on the administrator's display language thus set is stored in the HDD 214. When the system administrator logs into the MFP 101 after the administrator's display language is set, various types of information are displayed on the touch panel in the set administrator's display language.

FIG. 4 is a view showing an exemplary display language management table in the MFP 101. The display language management table 400 in FIG. 4 is comprised of combinations of user names 401 and display languages 402 and stored in the HDD 214. The user names 401 are user information managed in the display language management table 400, and they are, for example, last names, full names, or nicknames of users or ID numbers of users. The display languages 402 are display language information associated with users identified by the user names 401.

For example, when a user A uses the MFP 101, Japanese is displayed on the touch panel, and when a user B uses the MFP 101, English is displayed on the touch panel. This will be described later in detail with reference to a flowchart of FIG. 9.

Figure 5A:
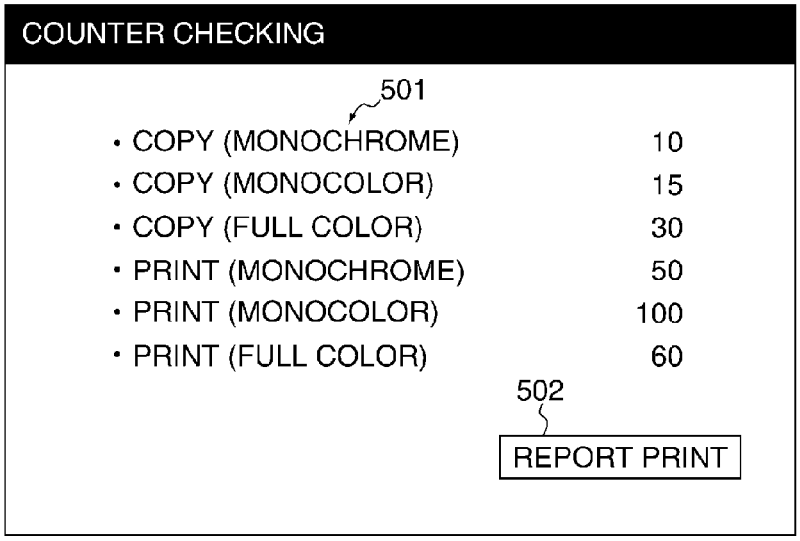
FIG. 5A is a view showing an exemplary operation screen displayed on the touch panel of the operation unit when manual report printing is to be performed by the MFP in FIG. 2.

FIG. 5A is a view showing an exemplary operation screen displayed on the touch panel of the operation unit 220 when manual report printing is to be performed. In manual report printing, a count obtained by counting the number of sheets printed by the MFP 101 is printed. The present invention, however, is not limited to this, but other reports (for example, a communication management report and a transmission result report, to be described later) may be manually output.

Figure 5B:
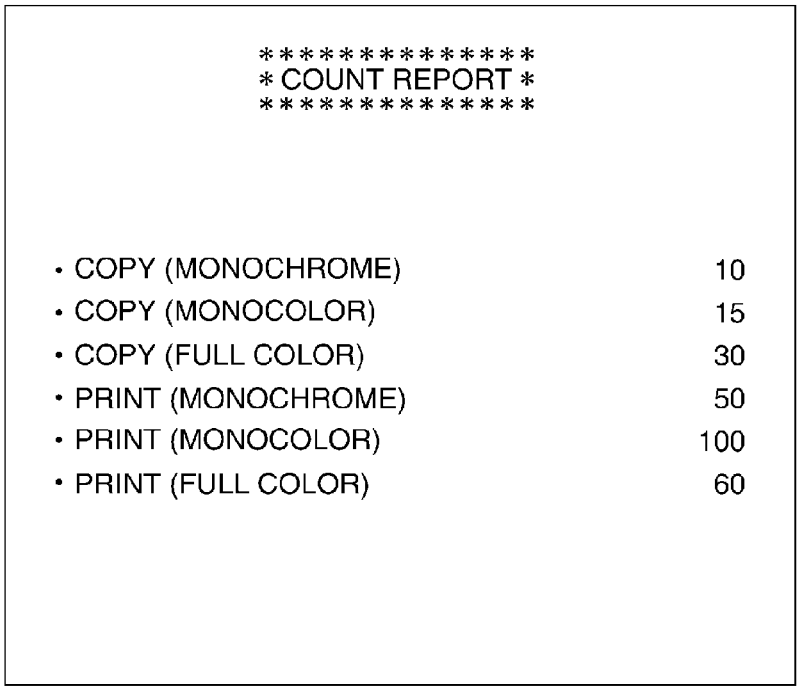
FIG. 5B is a view showing an exemplary count report output by the manual report printing.

Information 501 printed on a report to be output and a report print button 502 for use in instructing execution of report printing are displayed on the touch panel. The information 501, here, is comprised of information on processes such as copying (monochrome) and printing (monochrome) and the number of sheets processed in the processes, but the information 501 is not limited to them but may include other information. By seeing the information 501 and depressing (touching) the report print button 502, a user issues an instruction to perform manual report printing. FIG. 5B shows an exemplary count report which is an output matter obtained by the user depressing the report print button 502.

Figure 6A:
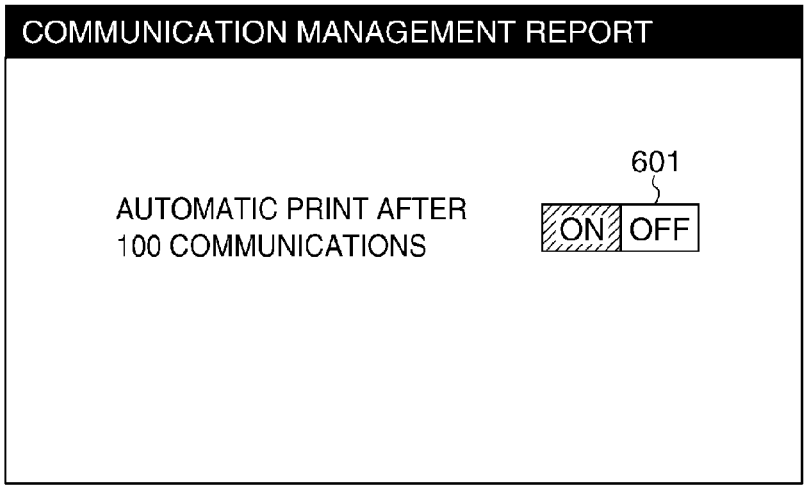
FIG. 6A is a view showing an exemplary operation screen displayed on the touch panel of the operation unit when settings on automatic printing of a communication management report, which is automatic report printing, are to be configured by the MFP in FIG. 2.

FIG. 6A is a view showing an exemplary operation screen displayed on the touch panel of the operation unit 220 when settings on automatic printing of a communication management report, which is automatic report printing, are to be configured. The control unit 210 of the MFP 101 manages communication histories with external apparatuses (the file server 102, the client PC, the facsimile, and so on), and the communication histories are stored in the HDD 214. The CPU 211 increments the total number of communication histories whenever communication histories are updated, and when the count reaches 100, the CPU 211 performs automatic report printing and resets the count to zero.

Figure 6B:
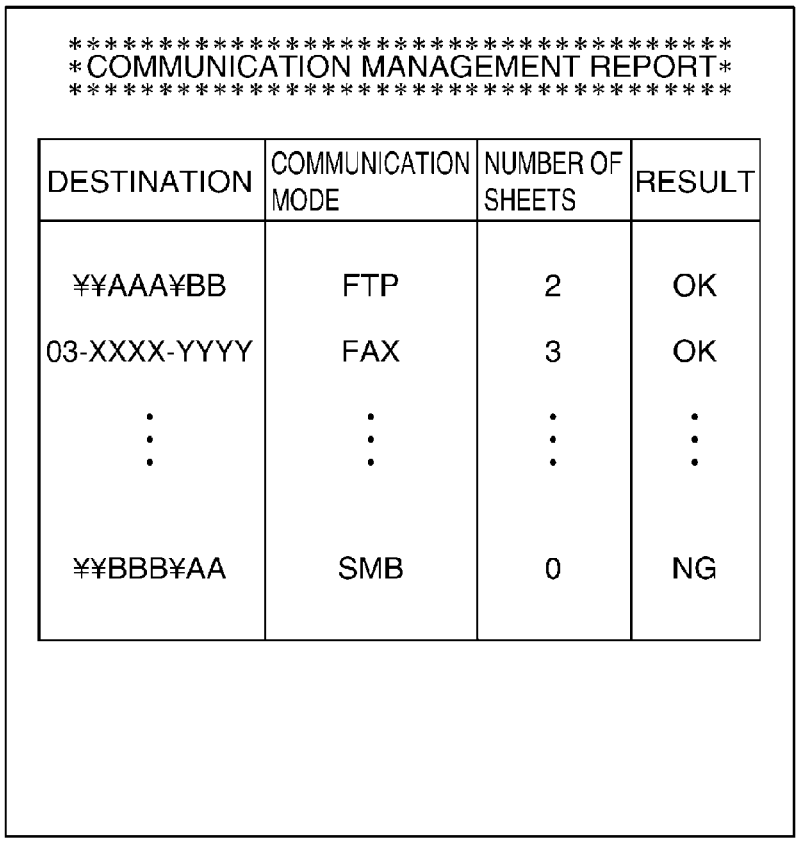
FIG. 6B is a view showing an exemplary communication management report.

"Automatic printing after 100 communications" displayed in FIG. 6A indicates a condition as to the timing with which a communication management report for use in managing communication histories is to automatically output. When the total number of communication histories satisfies this condition (100 communications), automatic report printing is performed. A switch 601 for selectively executing (turning on and off) automatic report printing is displayed on the touch panel. When the switch 601 is ON, a communication management report on which communication histories managed by the MFP 101 are printed is automatically output when the number of communication histories reaches 100. FIG. 6B shows an exemplary communication management report.

Figure 7A:
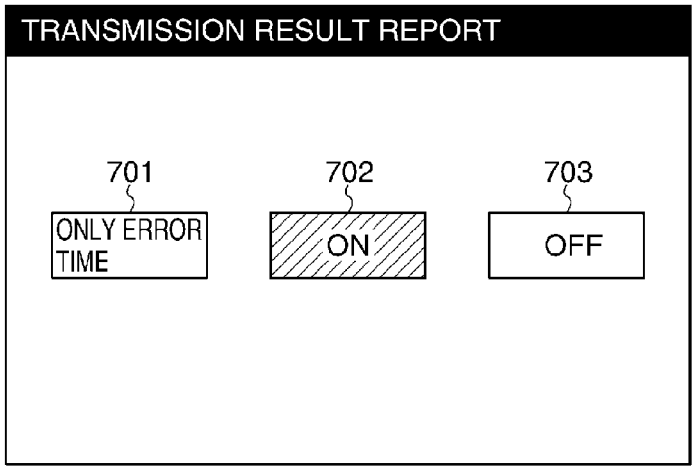
FIG. 7A is a view showing an exemplary operation screen displayed on the touch panel of the operation unit when settings on printing of a transmission result report, which is automatic report printing, are to be configured by the MFP in FIG. 2, and FIGS. 7B and 7c are views showing exemplary transmission result reports.
Figure 7B:
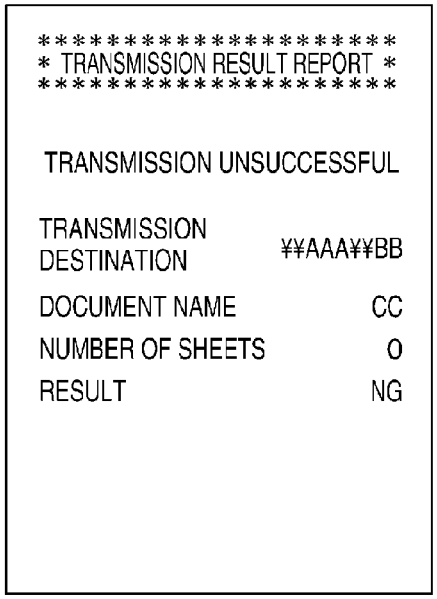

FIG. 7A is a view showing an exemplary operation screen displayed on the touch panel of the operation unit 220 when settings on printing of a transmission result report, which is automatic report printing, are to be configured. An only-error-time button 701 is a switch for making a setting that performs automatic report printing when a transmission error occurs. Thus, when the only-error-time button 701 is selected, a transmission result report showing a result of transmission of image data to an external apparatus is automatically printed (the file server 102, the client PC, the facsimile, or the like) only when the transmission ends in failure. FIG. 7B shows an exemplary transmission result report in a case where an error occurs.

Figure 7C:
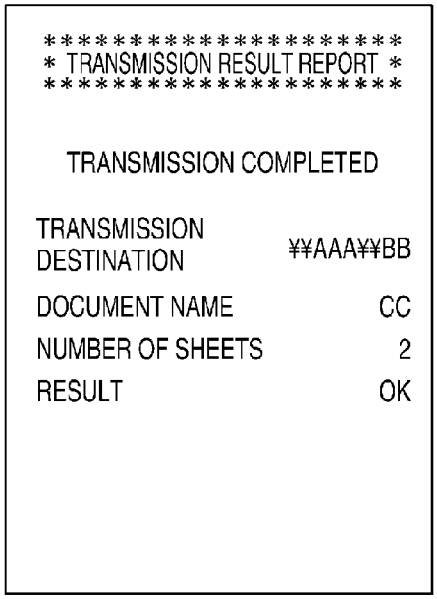

An ON button 702 is a switch for making a setting that performs automatic report printing without exception irrespective of transmission results. When the ON button 702 is selected, a transmission result report showing a result of transmission of image data to an external apparatus is automatically printed without exception irrespective of whether or not the transmission is successful. FIG. 7C shows an exemplary transmission result report output in a case where transmission is successfully completed. An OFF button 703 is a switch for making a setting that does not perform autonomic printing of a transmission result report.

FIG. 8 is a view showing a report management table 800 for the MFP 101. The report management table 800 is comprised of a report name field 801, an autonomic report field 802, and a result report field 803, and is stored in the HDD 214.

In the report name field 801, names of various reports such as a count report, a communication management report, and a transmission result report described above with reference to FIGS. 5A to 7C are stored. In the autonomic report field 802, settings as to whether the automatic report printing function is on or off are stored. In the result report field 803, settings as to whether or not a report with a corresponding report name is a result report, that is, whether or not, in a case where an image data transmission job or the like has been executed, a report showing a result thereof is to be output (ON or OFF) are stored. For a transmission result report, in the result report field 803, a selection result "only error time", "ON", or "OFF" shown in FIG. 7A is stored, and "ON" on the right hand of "ON-ON" in FIG. 8 indicates this setting.

Upon receiving a manual or automatic report printing instruction, the CPU 211 of the MFP 101 refers to information in the report management table 800 and determines whether or not the received report printing instruction is an instruction to perform automatic report printing and whether or not the received report printing instruction is an instruction to perform result report printing.

Figure 9:
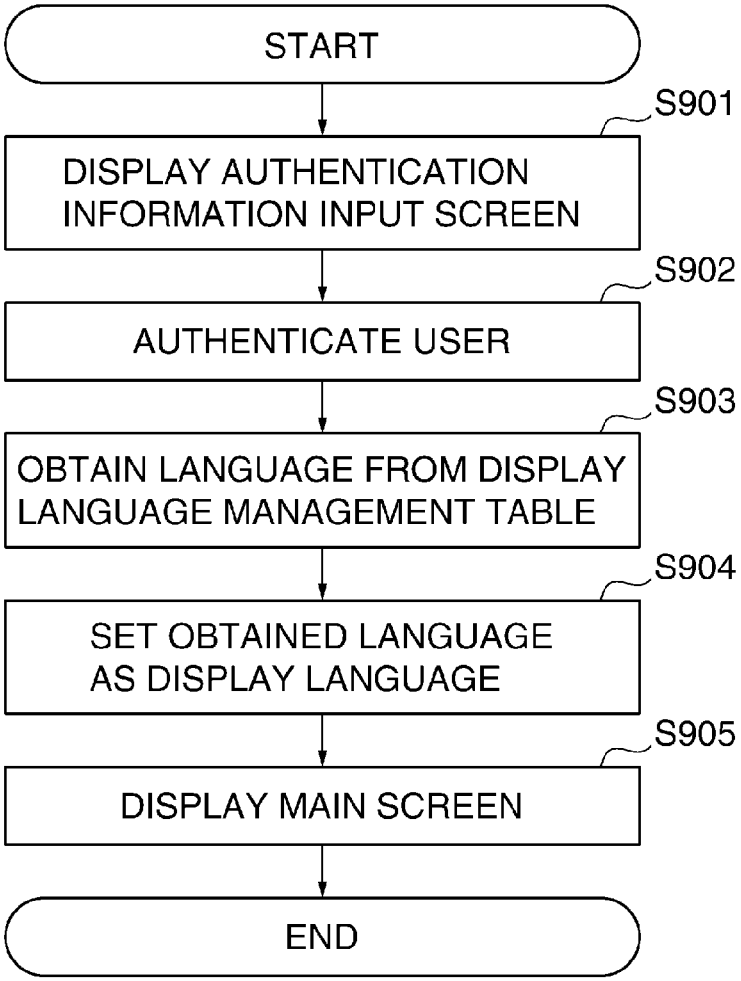
FIG. 9 is a flowchart of a process in which a language to be displayed on the touch panel which an operation unit of the MFP in FIG. 2 has is determined with respect to each user.

FIG. 9 is a flowchart of a process in which a language to be displayed on the touch panel of the operation unit 220 is determined with respect to each user. Processes in the flowchart in FIG. 9 are implemented by the CPU 211 expanding a control program, which is stored in the HDD 214, in a work area of the RAM 213.

In step S901, the CPU 211 receives authentication information input by a user. Next, in step S902, the CPU 211 authenticates and identifies the user who uses the MFP 101 based on the authentication information input in the step S901. For example, when using the MFP 101, each user lets an ID card reader (not shown in FIG. 1 or 2), which is provided in the MFP 101, read his/her own ID card. The CPU 211 of the MFP 101 identifies a user by collating information on an ID card read by the ID card reader with the display language management table 400. The user authentication method, however, is not limited to this, but any method may be used as long as users can be identified.

Then, in step S903, the CPU 211 obtains a language (display language) set for the user authenticated in the step S902 from the display language management table 400 (see FIG. 4). For example, when the authenticated user is identified as a user A, Japanese is obtained, and when the authenticated user is identified as a user B, English is obtained. It should be noted that when the system administrator logs in, the administrator's display language set on the operation screen 300 described earlier with reference to FIG. 3 is obtained.

Then, in step S904, the CPU 211 sets the language obtained in the step S903 as a display language for information to be displayed on the touch panel of the operation unit 220. This setting is stored in the HDD 214. After that, in step S905, the CPU 211 displays a main screen (main menu) in the language set in the step S904 on the touch panel of the operation unit 220, followed by termination of the process.

Figure 10:
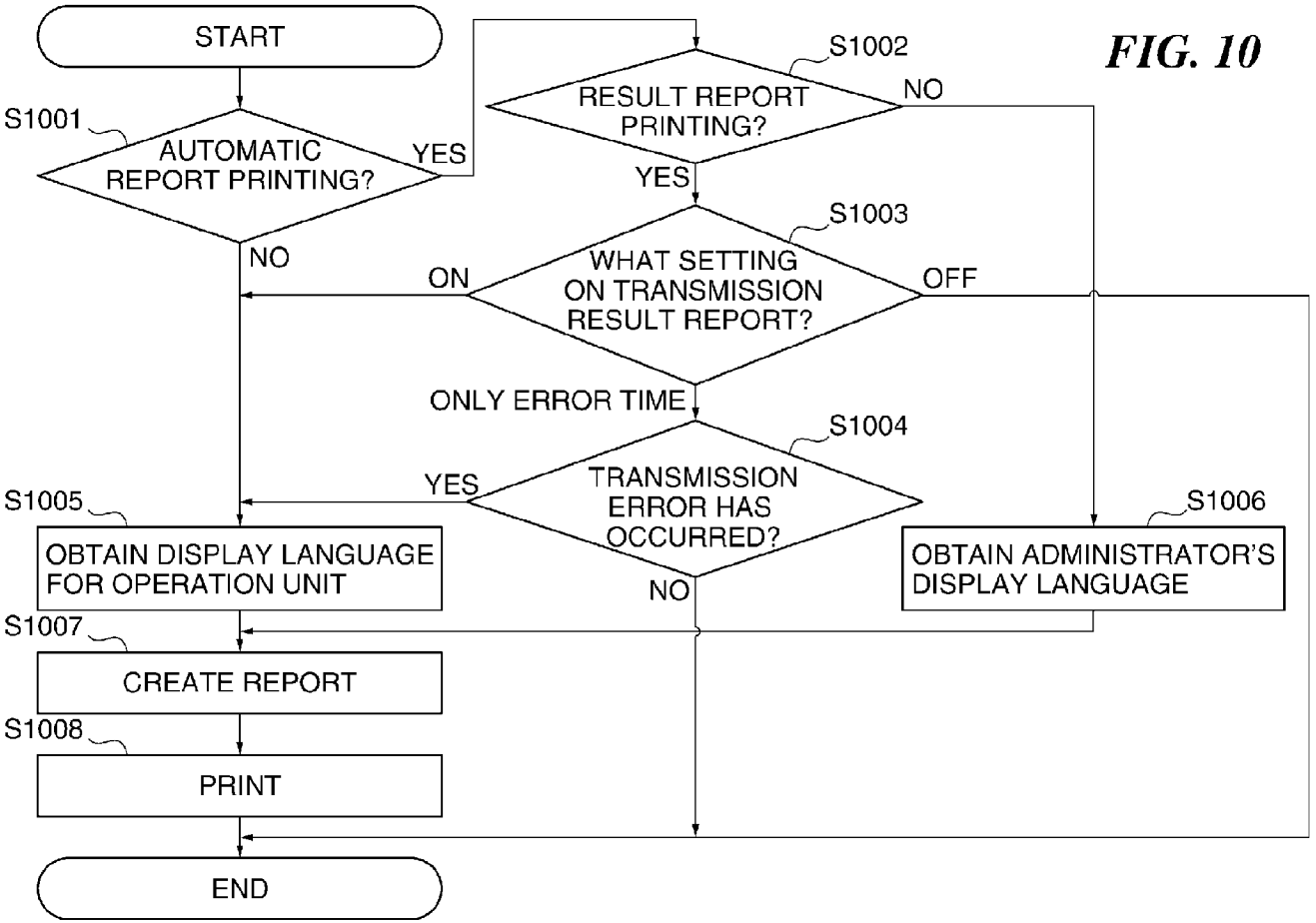
FIG. 10 is a flowchart of a report printing process carried out by the MFP in FIG. 2 according to a first embodiment.

FIG. 10 is a flowchart of a report printing process carried out by the MFP 101 according to a first embodiment.

Processes in the flowchart in FIG. 10 are implemented by the CPU 211 of the control unit 201 expanding a control program, which is stored in the HDD 214, in a work area of the RAM 213.

The process in FIG. 10 is started in response to the MFP 101 receiving an instruction to perform report printing. In step S1001, the CPU 211 determines whether or not the instruction is an instruction to perform automatic report printing based on the report management table 800 (see FIG. 8). When the instruction is an instruction to perform automatic report printing (YES in the step S1001), that is, when the autonomic report field 802 corresponding to a report name for which the printing instruction has been issued is ON, the process proceeds to step S1002. On the other hand, when the instruction is not an instruction to perform automatic report printing (NO in the step S1001), that is, when the autonomic report field 802 corresponding to a report name for which the printing instruction has been issued is OFF, the process proceeds to step S1005.

In the step S1002, the CPU 211 determines whether or not the instruction is an instruction to perform result report printing based on the report management table 800. When the instruction is an instruction to perform result report printing (YES in the step S1002), that is, when the result report field 803 corresponding to a report name for which the printing instruction has been issued is ON, the process proceeds to step S1003. On the other hand, when the instruction is not an instruction to perform result report printing (NO in the step S1002), that is, when the result report field 803 corresponding to a report name for which the printing instruction has been issued is OFF, the process proceeds to step S1006.

In the step S1003, the CPU 211 refers to the report management table 800 in FIG. 8 and causes the process to branch according to print settings in the transmission result report shown in FIG. 7A. When the setting on transmission result report printing is "ON", the process proceeds to the step S1005. When the setting on transmission result report printing is "only-error-time", the process proceeds to step S1004. When the setting on transmission result report printing is "OFF", the CPU 211 terminates the process without printing the transmission result report.

In the step S1004, the CPU 211 determines whether or not a transmission error has occurred. When the CPU 211 determines that a transmission error has actually occurred (YES in the step S1004), the process proceeds to the step S1005, and when no transmission error has occurred (NO in the step S1004), the CPU 211 terminates the process without printing the transmission result report.

In the step S1005, the CPU 211 obtains a report print language from the display languages for the operation unit 220, which were stored in the HDD 214 in the step S904 in FIG. 9. For example, as the report print language, Japanese is obtained for the user A, and English is obtained for the user B. In the step S1006, the CPU 211 obtains the administrator's display language set on the operation screen 300 in FIG. 3 as the report print language from the HDD 214.

After the steps S1005 and S1006 are completed, the process proceeds to step S1007, in which the CPU 211 in turn creates details of a report, for which the printing instruction has been issued, in the languages obtained in the steps S1005 and S1006. Then, in step S1008, the CPU 211 causes the printer unit 211 to print and output the report created in the step S1007, followed by termination of the process.

It should be noted in the report management table 800 in FIG. 8, the automatic report filed 802 is ON and the result report field 803 is ON for the transmission result report, and the setting on printing of the transmission result report print setting in FIG. 7A is ON. In this case, according to the flowchart of FIG. 10, a transmission result report is printed in the display language for the operation unit 220. This takes into consideration the fact that a transmission result report is used in many cases by a user who has executed the transmission job.

The present invention, however, is not limited to this arrangement, but a transmission result report may be output in the administrator's display language set on the operation screen 300 in FIG. 3. In this case, when it is determined in the step S1003 that the transmission result report print setting in FIG. 7A is ON, the process should proceed to the step S1006, not to the step S1003.

As described above, according to the present embodiment, in either manual report printing or automatic report printing, the user of the MFP 101 performs desired report printing in languages desired by the user and the system administrator.

Next, a description will be given of a second embodiment of the present invention. In the following description of the second embodiment, detailed description of the same features as those in the first embodiment, such as the hardware arrangement of the image processing system, is omitted.

In the second embodiment, even in a case where OFF (the OFF button 703) or only-error-time (the only-error-time button 701) is selected in FIG. 7A, a transmission result report is printed and output in the display language for the operation unit 220 when the user explicitly selects to print the transmission result report before executing a transmission job. Also, in a case where ON (the ON button 702) is selected in FIG. 7A, a transmission result report is printed and output in the display language for the operation unit 220 and the administrator's display language when the user explicitly selects to print the transmission result report before executing a transmission job.

Figure 11:
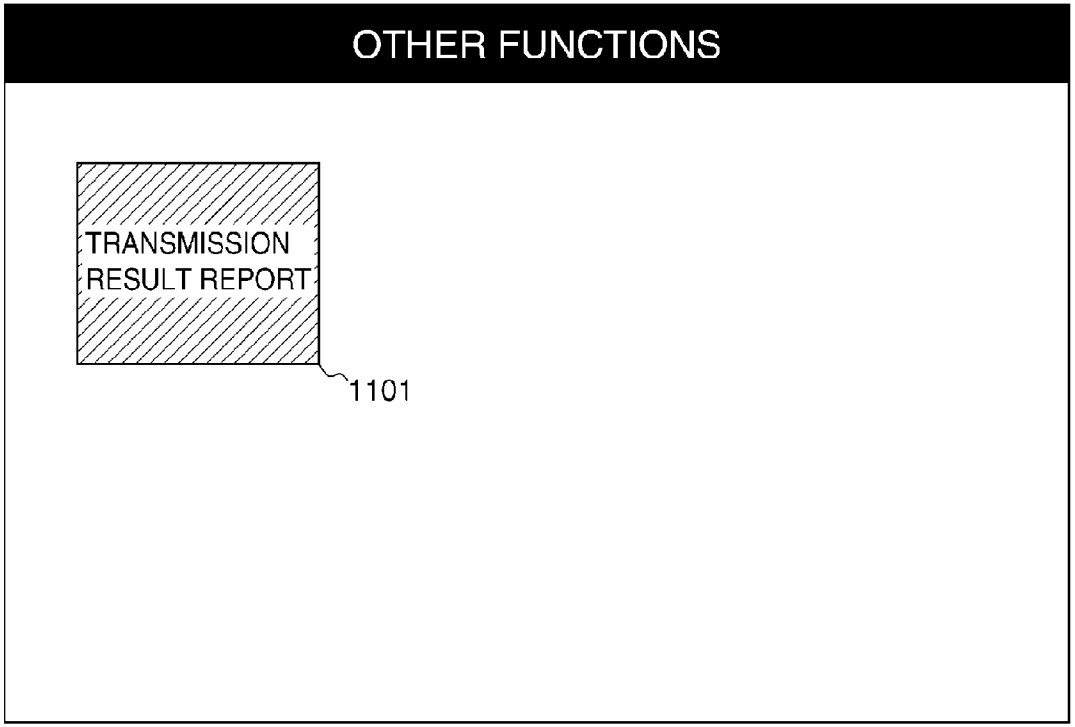
FIG. 11 is a view showing an exemplary operation screen displayed on the touch panel of the operation unit when the user explicitly makes a setting that performs a transmission result report using the MFP in FIG. 2.

FIG. 11 is a view showing an exemplary operation screen displayed on the touch panel of the operation screen 220 when the user explicitly makes a setting that prints a transmission result report. The operation screen in FIG. 11 is displayed on the touch panel by the user depressing, for example, an option button, not shown, displayed on a menu screen, not shown, of the touch panel of the operation unit 220 when he or she explicitly issues an instruction to print a result report.

A transmission result report button 1101 is a button for the user to explicitly designates printing of a transmission result report when executing a transmission job (file transmission or mail transmission). When the transmission result report button 1101 is depressed (selected), a transmission result report is printed in a display language for the operation unit 220 even in a case where OFF or only-error-time is selected in the print setting in FIG. 7A. Also, when ON is selected in FIG. 7A, a transmission result report is printed in a display language for the operation unit 220 as usual (when the determination result is ON in the step S1003 in FIG. 10), and the transmission result report is also printed in an administration's display language.

Figure 12A:
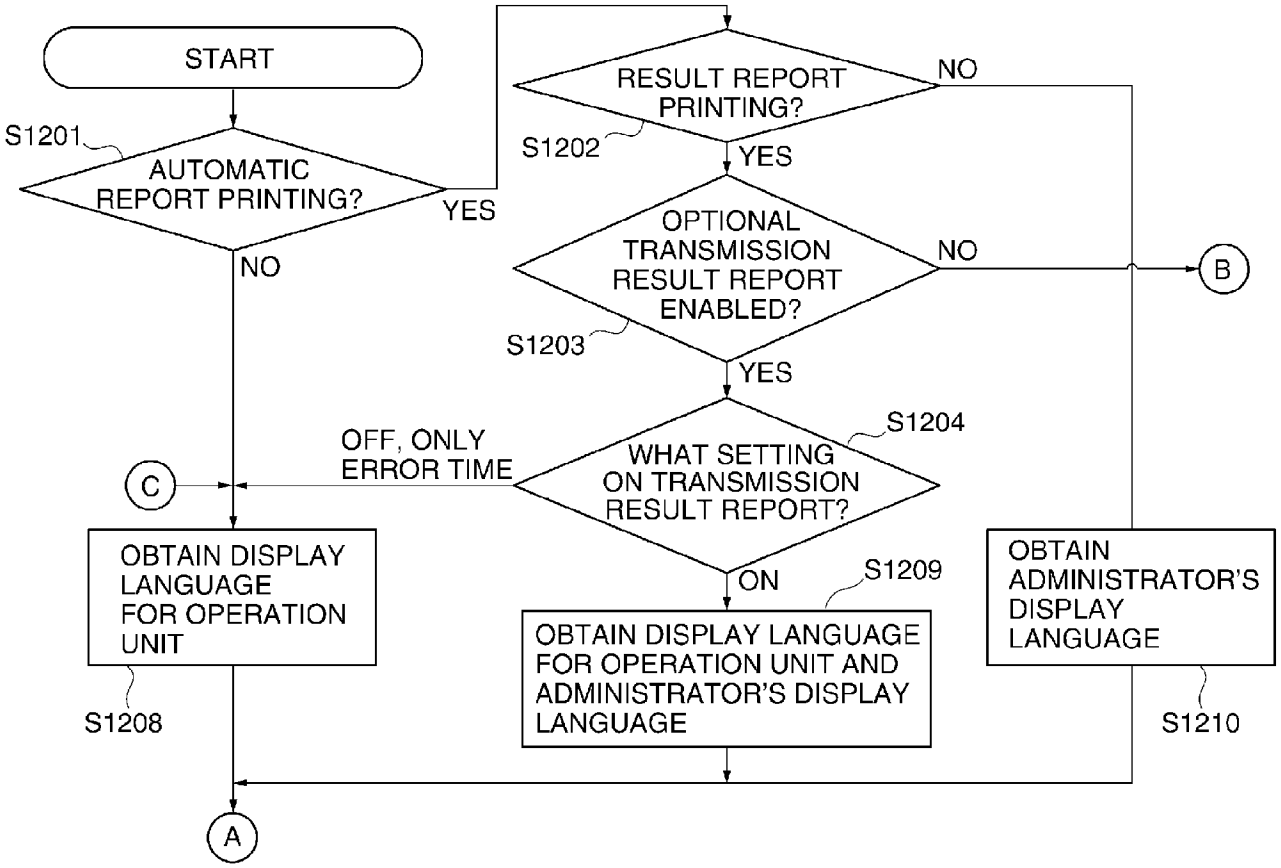
FIGS. 12A and 12B are flowcharts of a report printing process carried out by the MFP in FIG. 2 according to a second embodiment.
Figure 12B:
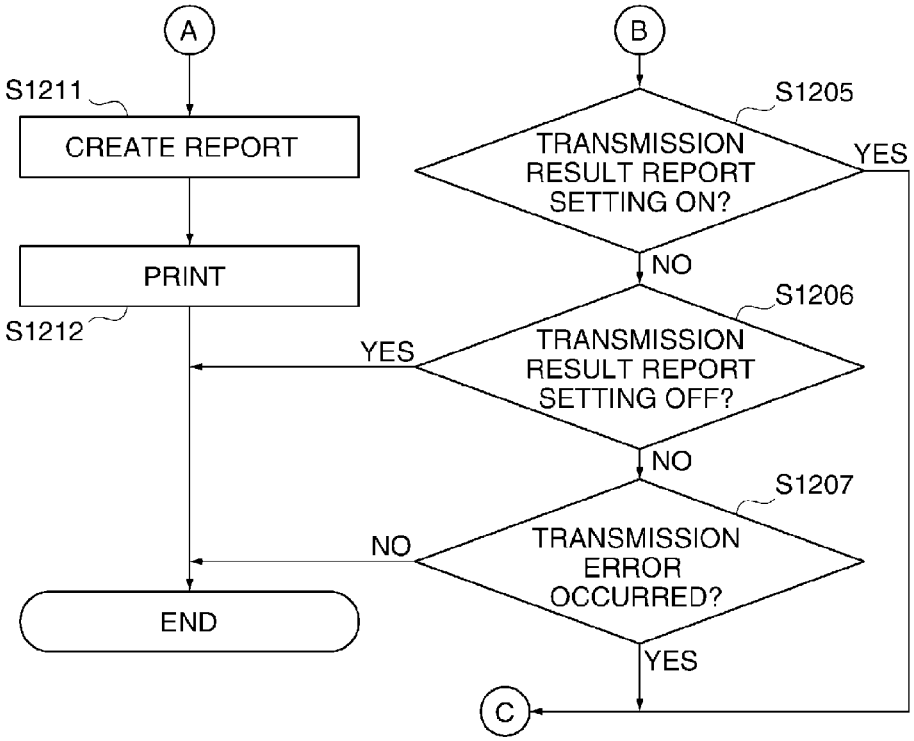

FIGS. 12A and 12B are flowcharts of a report printing process carried out by the MFP 101 according to a second embodiment. Processes in the flowchart in FIGS. 12A and 12B are implemented by the CPU 211 expanding a control program, which is stored in the HDD 214, in a work area of the RAM 213.

The process in FIGS. 12A and 12B is started in response to the MFP 101 receiving an instruction to perform report printing. First, in step S1201, the CPU 211 determines whether or not the instruction is an instruction to perform automatic report printing based on the report management table 800 (see FIG. 8). When the instruction is an instruction to perform automatic report printing (YES in the step S1201), that is, when the autonomic report field 802 corresponding to a report name for which the printing instruction has been issued is ON, the process proceeds to step S1202. On the other hand, when the instruction is not an instruction to perform automatic report printing (NO in the step S1201), that is, when the autonomic report field 802 corresponding to a report name for which the printing instruction has been issued is OFF, the process proceeds to step S1208.

In the step S1202, the CPU 211 determines whether or not the instruction is an instruction to perform result report printing based on the report management table 800. When the instruction is an instruction to perform result report printing (YES in the step S1202), that is, when the result report field 803 corresponding to a report name for which the printing instruction has been issued is ON, the process proceeds to step S1203. On the other hand, when the instruction is not an instruction to perform result report printing (NO in the step S1202), that is, when the result report field 803 corresponding to a report name for which the printing instruction has been issued is OFF, the process proceeds to step S1210.

In the step S1203, the CPU 211 determines whether or not the transmission result report button 1101 in FIG. 11 is selected, that is, whether or not an optional transmission result report is enabled. When the transmission result report button 1101 is selected (YES in the step S1203), the process proceeds to step S1204. When the transmission result report button 1101 is not selected (NO in the step S1203), the process proceeds to step S1205.

In the step S1204, the CPU 211 obtains a setting on transmission result report printing in FIG. 7A from the report management table 800 in FIG. 8 and causes the process to branch according to the obtained information. When the setting in FIG. 7A is "only-error-time" or "OFF", the process proceeds to the step S1208, and when the setting in FIG. 7A is "ON", the process proceeds to step S1209.

In the step S1205, the CPU 211 determines whether or not the setting in FIG. 7A is "ON". When the setting in FIG. 7A is "ON" (YES in the step S1205), the process proceeds to the step S1208, and when the setting in FIG. 7A is not "ON" (NO in the step S1205), the process proceeds to the step S1206. In the step S1206, the CPU 211 determines whether or not the setting in FIG. 7A is "OFF". When the setting in FIG. 7A is "OFF" (YES in the step S1206), the CPU 211 terminates the process, and when the setting in FIG. 7A is not "OFF", that is, when the setting in FIG. 7A is configured at "only-error-time" (NO in the step S1206), the process proceeds to step S1207. In the step S1207, the CPU 211 determines whether or not a transmission error has occurred. When a transmission error has actually occurred (YES in the step S1207), the process proceeds to the step S1208, and when no transmission error has occurred (NO in the step S1207), the CPU 211 terminates the process.

In the step S1208, the CPU 211 obtains a report print language from display languages for the operation unit 220, which were stored in the HDD 214 in the step S904 in FIG. 9. For example, as the report print language, Japanese is obtained for a user A, and English is obtained for a user B. In the step S1209, as the report print language, the CPU 211 obtains a display language for the operation unit 220, which was stored in the HDD 214 in the step S904 in FIG. 9, and obtains the administrator's display language set on the operation screen 300 in FIG. 3 from the HDD 214. In the step S1210, the CPU 211 obtains the administrator's display language set on the operation screen 300 in FIG. 3 from the HDD 214 as the report print language.

After the steps S1208, S1209, and S1210 are completed, the process proceeds to step S1211, in which the CPU 211 in turn creates details of a report for which the printing instruction has been issued in the languages obtained in the respective steps S1208, S1209, and S1210. Then, in step S1212, the CPU 211 causes the printer unit 211 to print and output the report created in the step S1211, followed by termination of the process.

It should be noted when the display language for the operation unit 220 and the administrator's display language are obtained in the step S1209, a transmission result report written in the display language for the operation unit 220 and a transmission result report written in the administrator's display language are output. At this time, the transmission result reports written in the respective languages may be printed on different sheets, resulting in two sheets being output, or the transmission result reports written in the respective languages may be printed collectively on one sheet, resulting in one sheet being output.

As described above, according to the present embodiment, by explicitly selecting printing of a transmission result report before executing a transmission job, the user prints the transmission result report in the display language for the operation unit 220. This enhances the convenience for the user who issues an instruction to execute a transmission job. Moreover, a transmission result report written in both the display language for the operation unit 220 and the administrator's display language is printed, and this enhances the convenience for both the user who issues an instruction to execute a transmission job and the system administrator.

It should be noted in the embodiments described above, the MFP 101 carries out the processes in the flowcharts of FIGS. 9 and 10 using one memory (the RAM 213 or the HDD 214). The present invention, however, is not limited to this, but for example, a plurality of CPUs may work in collaboration with each other using one or a plurality of memories to carry out the processes in the flowcharts of FIGS. 9 and 10.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-228222, filed Nov. 1, 2013, which is hereby incorporated by reference wherein in its entirety.

What is claimed is:

[1. An image processing apparatus comprising:

a printing unit;

a storage unit configured to store information on the image processing apparatus;

a display control unit configured to display an operation screen in a display language associated with a log-in user who has logged in to the image processing apparatus; and a print control unit configured to control execution of manual report printing in which the information is printed by said printing unit as a report, based on an instruction input by using the operation screen displayed in the display language for the log-in user, wherein said print control unit performs the manual report printing in the display language for the log-in user.]

[2. The image processing apparatus according to claim 1, wherein the information stored in said storage unit includes setting information and history information on the image processing apparatus.]

[3. The image processing apparatus according to claim 1, wherein said display control unit displays information for the log-in user.]

[4. The image processing apparatus according to claim 1, wherein said print control unit controls execution of automatic report printing in which the information is automatically printed by said printing unit as a report, and said printing unit performs the automatic report printing in a predetermined language.]

[5. The image processing apparatus according to claim 1, wherein the predetermined language is a display language for an administrator of the image processing apparatus.]

[6. The image processing apparatus according to claim 1, wherein the display language for the log-in user is a language associated with each user of the image processing apparatus.]

[7. The image processing apparatus according to claim 4, wherein results of a plurality of transmission jobs in which image data is sent is stored as transmission log information in said storage unit, and the transmission log information stored in said storage unit is printed in the automatic report printing or the manual report printing.]

[8. The image processing apparatus according to claim 7, wherein said print control unit controls execution of the automatic report printing when the number of executed transmission jobs reaches a predetermined number.]

[9. A method of controlling an image processing apparatus including a printing unit and a storage unit, the method comprising:

storing, in the storage unit, information on the image processing apparatus;

displaying an operation screen in a display language associated with a log-in user who has logged in to the image processing apparatus; and controlling execution of manual report printing in which the information is printed by the printing unit as a report, based on an instruction input by using the operation screen displayed in the display language for the log-in user, wherein the manual report printing is performed in the display language for the log-in user.]

[10. A non-transitory computer-readable storage medium storing a program that, when executed by a computer, causes the computer to perform a method of controlling an image processing apparatus including a printing unit and a storage unit, the method comprising:

storing, in the storage unit, information on the image processing apparatus;

displaying an operation screen in a display language associated with a log-in user who has logged in to the image processing apparatus; and controlling execution of manual report printing in which the information is printed by the printing unit as a report, based on an instruction input by using the operation screen displayed in the display language for the log-in user, wherein the manual report printing is performed in the display language for the log-in user.]

*11. A printing apparatus comprising:*

*a printing unit;*

*a storage unit configured to store history information of communication executed by the printing apparatus;*

*a display control unit configured to display, on a display, an operation screen in a display language set in association with a log-in user who logs in to the printing apparatus; and*

*a print control unit configured to execute manual report printing in which history information is printed as a report, the manual report printing being triggered by an execution instruction input by the log-in user by using the operation screen displayed in the display language set in association with the log-in user, and to execute automatic report printing in which history information is printed as a report, the automatic report printing being triggered by an error of the communication executed by the printing apparatus,*

*wherein the print control unit is configured to execute the manual report printing in the display language set in association with the log-in user and to execute the automatic report printing in a display language independently set of the display language set in association with the log-in user.*

*12. The printing apparatus according to claim 11, wherein the display language set in association with the log-in user is set based on at least one instruction by a log-in user who has an administrative right and has logged in to the printing apparatus.*

*13. The printing apparatus according to claim 11, wherein the history information printed as the report by the manual report printing is history information of facsimile communication executed by the printing apparatus.*

*14. The printing apparatus according to claim 11, wherein the history information printed as the report by the automatic report printing is information indicating that the communication executed by the printing apparatus is unsuccessful.*

*15. The printing apparatus according to claim 11,*

*wherein the print control unit is configured to execute, in response to selection of an object on the operation screen by the log-in user, the manual report printing.*

*16. A method of controlling a printing apparatus including a printing unit and a storage unit, the method comprising:*

*storing history information of communication executed by the printing apparatus;*

*displaying, on a display, an operation screen in a display language set in association with a log-in user who logs in to the printing apparatus; and*

*executing manual report printing in which history information is printed as a report, the manual report printing being triggered by an execution instruction input by the log-in user by using the operation screen displayed in the display language set in association with the log-in user, and executing automatic report printing in which history information is printed as a report, the automatic report printing being triggered by an error of the communication executed by the printing apparatus,*

*wherein the manual report printing is executed in the display language set in association with the log-in user and the automatic report printing is executed in a display language independently set of the display language set in association with the log-in user.*

*17. The method according to claim 16, wherein the display language set in association with the log-in user is set based on at least one instruction by a log-in user who has an administrative right and has logged in to the printing apparatus.*

*18. The method according to claim 16, wherein the history information printed as the report by the manual report printing is history information of facsimile communication executed by the printing apparatus.*

*19. The method according to claim 16,*

*wherein the history information printed as the report by the automatic report printing is information indicating that the communication executed by the printing apparatus is unsuccessful.*

*20. The method according to claim 16,*

*wherein the manual report printing is executed in response to selection of an object on the operation screen by the log-in user.*

* * * * *